UNITED STATES PATENT OFFICE.

RICHARD V. MATTISON, OF AMBLER, PENNSYLVANIA.

NON-HEAT-CONDUCTING COMPOSITION.

SPECIFICATION forming part of Letters Patent No. 492,092, dated February 21, 1893.

Application filed July 20, 1892. Serial No. 440,652. (No specimens.)

*To all whom it may concern:*

Be it known that I, RICHARD V. MATTISON, a citizen of the United States, residing at Ambler, county of Montgomery, and State of Pennsylvania, have invented a new and useful Improvement in Non-Heat-Conducting Compositions for Covering Boilers, Steam-Pipes, &c., of which the following is a full, clear, and exact description.

My manner of making my non-heat-conducting composition is as follows: I take of calcium carbonate seventy parts by weight, of magnesium carbonate, twenty parts by weight and of asbestus ten parts by weight. These materials in a pulverized and pasty condition are mixed together in a pug-mill or similar mixer and then molded into the desired shape for pipes or boiler coverings and dried. When applied to pipes or boilers a canvas jacket is placed around them in a well known manner. I find the above proportions of the several materials to give good results, but they may be varied considerably and still produce good results.

Having now fully described my invention, what I claim, and desire to protect by Letters Patent, is—

A non-heat-conducting composition composed of calcium carbonate, magnesium carbonate and asbestus, as above described.

In testimony of which invention I have hereunto set my hand.

RICHARD V. MATTISON.

Witnesses:
GEO. W. REED,
FRANK S. BUSSER.